United States Patent [19]

Mehnert et al.

[11] Patent Number: 4,854,709
[45] Date of Patent: Aug. 8, 1989

[54] ARRANGEMENT FOR MEASURING THE DISTANCE OF A MARKING ELEMENT ON A DISPLACEABLE BODY FROM A REFERENCE MARKING ELEMENT

[75] Inventors: Walter Mehnert, Ottobrunn; Thomas Theil, Feldafing, both of Fed. Rep. of Germany

[73] Assignee: MITEC Moderne Industrietechnik GmbH, Ottobrunn, Fed. Rep. of Germany

[21] Appl. No.: 26,711

[22] Filed: Mar. 17, 1987

[30] Foreign Application Priority Data

Mar. 17, 1986 [DE] Fed. Rep. of Germany ....... 3608884

[51] Int. Cl.⁴ .............................................. G01B 11/00
[52] U.S. Cl. .................................... 356/375; 356/400; 356/401
[58] Field of Search ................... 250/237 G; 356/375, 356/376, 373, 400, 401

[56] References Cited

U.S. PATENT DOCUMENTS

| 2,674,915 | 4/1954 | Anderson | 356/386 |
| 4,659,228 | 4/1987 | Totsuka et al. | 356/401 |
| 4,673,810 | 6/1957 | Babsch et al. | 250/237 G |

*Primary Examiner*—F. L. Evans
*Attorney, Agent, or Firm*—Sughrue, Mion, Zinn, Macpeak & Seas

[57] ABSTRACT

A measuring arrangement for determining the spacing from a reference marking element of a marking element which is provided on a body which is displaceable relative to the measuring arrangement, for example a scale carrier (20). The measuring arrangement includes a scanning means having a receiver (8) and a transmitter (11) which emits radiation by means of which a scanning spot (22) is produced on the surface of the body, which carries the marking element, the radiation of the scanning spot, which is influenced by the marking element, being received by the receiver and being converted into an electrical output signal from which a computing and storage unit (10) determines the spacing being sought. To increase the scanning rate, it is provided that the scanning means is arranged immovably with respect to the predetermined reference marking element and that provided between the transmitter and the scale carrier is a deflecting means (14), which, preferably by means of an electrical and/or magnetic field, moves the scanning spot over the marking element independently of a relative movement between the scanning means and the body.

13 Claims, 3 Drawing Sheets

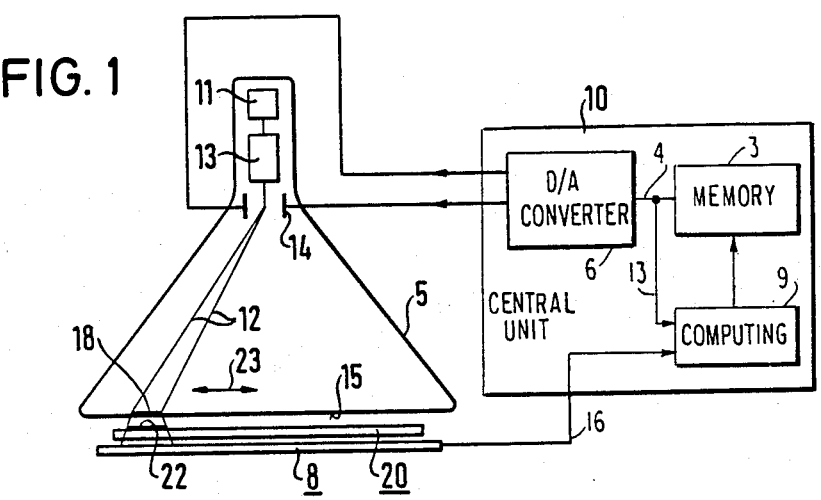
FIG. 1
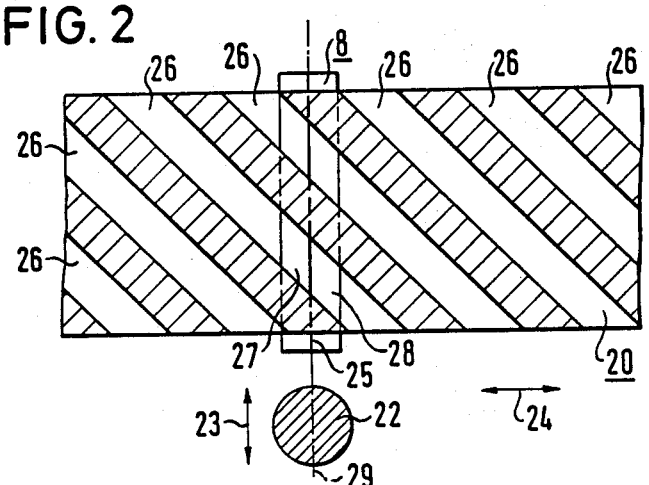
FIG. 2
FIG. 3
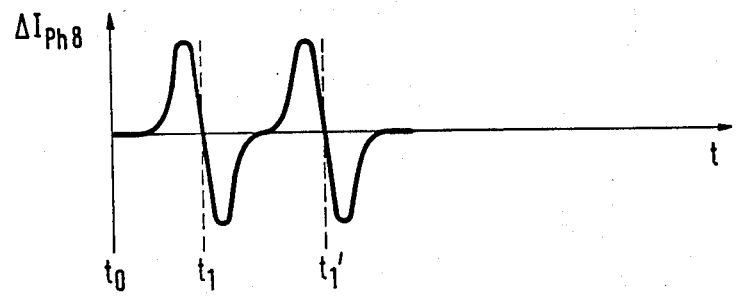

ARRANGEMENT FOR MEASURING THE DISTANCE OF A MARKING ELEMENT ON A DISPLACEABLE BODY FROM A REFERENCE MARKING ELEMENT

FIELD OF THE INVENTION

The invention concerns to a measuring arrangement for determining the spacing of a marking element provided on a body displaceable relative to the measuring arrangement, from a reference marking element.

BACKGROUND OF THE INVENTION

An embodiment of such a measuring arrangement is described for example in German laid-open application (DE-OS) No. 31 51 798. Therein, the body which is displaceable relative to the measuring arrangement is formed by a scale carrier, the surface of which carries a multiplicity of scale division markings wherein, in each position of the scale carrier, at least one of the markings is passed over by a scanning spot generated by the scanning means. A reference line which is predetermined by the measuring arrangement itself serves as the reference marking element. Such an arrangement is used in any situation which involves determining and measuring off with a high degree of accuracy the relative position of two bodies which can be linearly displaced relative to each other or which can be rotated about an axis relative to each other. Examples in that respect are the tool slides of a machine tool which must be positioned with a high degree of accuracy relative to a workpiece which is clamped in the machine, or the telescope of a levelling instrument which is moved relative to the support stand into different azimuth angle positions, the angular spacings of which have to be ascertained with the maximum possible degree of accuracy.

In all those situations, one of the two bodies, for example the machine frame structure or the support stand, carries the scale carrier and the other of the two bodies, for example the tool carriage or the rotary base of the telescope, carries the scanning device, which is operable to ascertain the number of scale carrier markings which are passed over upon linear displacement or upon rotary movement or to measure the spacings between said markings, and which on the other hand, when a new position is reached, is operable to ascertain the spacing of at least one of the markings from the reference line. The latter aspect serves in particular to achieve the maximum level of resolution capability without at the same time having to use a very high level of density of markings on the scale carrier. If in addition, in respect of all mutually adjacent markings, measurements are made in respect of the spacings of those respective markings from the reference line, in a suitable position, it is possible therefrom to detect with a very high degree of accuracy the spacings of the markings from each other so that in that way the entire scale carrier can subsequently be calibrated with a very high degree of accuracy without having to set particular requirements in regard to the degree of accuracy with which the markings have been applied thereto.

In accordance with German laid-open application (DE-OS) No. 31 51 798, the scanning device includes a light source as a transmitter and a differential photodiode as a receiver, the light source and the photodiode being arranged in mutually opposite relationship on the two sides of the scale carrier so that the scale carrier and the markings thereon are scanned by a transillumination process. It is likewise possible however for the transmitter and the receiver to be disposed on the same side of the scale carrier; in that case, the markings must differ from the areas of the scale carrier around the markings, not in regard to transparency but in regard to the reflection factor.

At any event, in accordance with DE-OS No. 31 51 798, the entire scanning device including the transmitter and the receiver is displaced with an oscillatory reciprocating movement which is independent of a relative movement as between the two bodies, in order to be able to carry out the above-mentioned interpolation and calibration measuring operations. By means of a small auxiliary scale carrier which also moves with the scanning device, and a fixed auxiliary scanning device which scans the auxiliary scale carrier, the movement of the scanning device is monitored and measured in such a way that the spacings of scanned markings on the actual scale carrier from a reference line predetermined by the measuring arrangement, for example from the key or crucial measuring line of the auxiliary scanning device, can be ascertained with a high degree of accuracy.

A further possible use in respect of the measuring arrangement set forth in the opening part of this specification is represented for example by adjusting devices in which a body has to be moved into a precisely defined position, the attainment of which is detected for example by virtue of the fact that the spacing between the marking element on the body and a reference marking element becomes equal to zero. Such an adjusting operation occurs for example in the photolithography process in semiconductor manufacture, wherein a photomask has to be put into a precisely defined position relative to a silicon wafer. In that case, the attainment of the required position is detected by virtue of suitable relative displacement as between the silicon wafer and the photomask causing two adjusting crosses to be brought into alignment with each other, one adjustment cross being disposed on the silicon wafer and the other on the photomask, and one of the adjusting crosses serving as the marking element and the respective other cross serving as the reference marking element. Another option is that a line which is to be found in any case on the body to be displaced, such as for example an edge of the body, serves as a marking element and the body is moved into a position in which the spacing between that line or the edge of the body and a reference marking element disappears, at least when viewed in a projection or viewing direction, that is to say the above-mentioned spacing becomes zero, when the body has reached the position in which it is to be put by way of the adjusting operation. In principle, in order to automate such an adjusting operation, it is also possible to use a suitably modified measuring apparatus of the kind described in DE-OS No. 31 51 798, with a mechanically oscillating scanning device.

However a disadvantage of that known arrangement is that, even with an extremely miniaturized construction in regard to the scanning device, a certain minimum mass has to be mechanically reciprocated, that is to say, it has to be periodically accelerated and decelerated. That results in a maximum scanning frequency which is inadequate at least when a machine carriage or slide or a body to be adjusted into a given position is to be moved at high speed into a precisely defined position or for example a target tracking telescope is to be turned with a rapidly moving target.

In the face thereof, it is an objective of the present invention to provide a measuring arrangement for determining the distance between a displaceable marking element and a reference marking element, which makes it possible to achieve a substantially higher scanning and measuring frequency.

SUMMARY OF THE INVENTION

This object is solved in accordance with the present invention by reducing the mass entirely to zero which has to be reciprocated for the purposes of scanning the scale carrier.

To this purpose the transmitter is in the form of the electron gun of an electron beam tube whose electrostatic deflecting unit forms the deflector means, by way of which the electron beam can be so controlled that the light spot generated by the electron beam when it impinges onto the fluorescent screen of the tube is moved in any directions over the surface of the body. Such a tube may not only be used to produce in a simple manner a linear or arcuate reciprocating movement of the scanning spot, as will be described in the following examples and in which for example there is only ever a part of a scale carrier that is scanned. On the contrary it is also possible for for example a circular scale carrier with radially extending markings to be of such dimensions and arrangement that it is disposed entirely in the projection region of the electron beam and can therefore be completely scanned by the scanning spot in any angular position. If the individual markings are identified as individuals, for example by virtue of each thereof being disposed relative to the markings adjacent thereto, at a spacing which occurs only once over the entire scale carrier, then, with such an arrangement, all markings may be referred to in order to ascertain the instantaneous angular position of such a scale carrier, whereby it is possible to achieve a particularly high degree of accuracy.

When using an electron beam tube it is also readily possible for two or more scanning spots to be generated simultaneously and for those scanning spots to be moved over the surface of the body in a fixedly predeterminable and precisely defined temporal and/or locational correlation, as occurs in an embodiment which will be described in greater detail hereinafter.

Due to the fact that the subject of the invention provides that it is now the scanning spot but not the receiver that is displaced relative to the body, the differential characteristic of the output signal of the receiver, which is to be found in the state of the art, is lost in the first instance, that is to say, unless further steps are taken. In the most general case therefore, when the scanning spot passes over a marking element, the arrangement produces a signal which rises from a rest level (in a positive or negative direction), passes through a first turning point and then reaches a maximum in order then to fall away again and, after passing through a second turning point, to return to the rest level again. Admittedly, even with such a signal which is expanded in respect of time, it is possible to detect and precisely determine in each case a point in time which is to be deemed to be the actual "scanning time" of the marking element, that is to say the point in time at which an infinitely narrow "ideal" mark which replaces the real marking element which is expanded in respect of space, was passed over by an also infinitely narrow scanning spot. For example the centre point between the two turning points mentioned may be used for that purpose. However, the level of expenditure required for that procedure, in terms of electronics and measuring procedure, is comparatively high so that the invention preferably provides that in this case also the output signal of the receiver has a differential characteristic when scanning a marking, that is to say, starting from a rest level, it first passes through a maximum in one direction and then a maximum in the other direction, before returning to the rest level. The time of the very steep passage through the rest level which that signal has, between passing through the two extremes, and which is referred to in the present context as the "passage through zero" for the sake of brevity (although the rest level does not have to be identical with zero potential) can be electronically detected in a very simple manner and can be utilized for triggering off further computing and evaluation operations. In particular that moment in time is capable of being reproduced with a very high degree of accuracy, irrespective of the specific configuration of the real marking element and the scanning spot used for scanning same, and it is therefore excellently suited for use as an ideal mark.

In the following three, preferred embodiments will be described which make it possible to provide a differential characteristic in respect of the receiver output signal in the measuring arrangement according to the invention. Firstly, the scanning operation in respect of an individual marking element, is described which scanning operation can be used in the abovementioned adjusting procedures, in accordance with the invention.

However, in accordance with the invention, scale carriers corresponding to the preferred embodiments for producing a differential characteristic in respect of the receiver output signal usually have a plurality of marking elements of the same configurations, which must each also comply with certain additional features. Scale carriers of that kind and the scanning thereof are described in greater detail with reference to the drawings.

At this point attention should also be directed to an advantage which is to be found in a preferred embodiment of the measuring arrangement according to the invention: in each scanning operation, the scanning spot starts from an initial point which is predetermined by the geometry of the scanning device and an initial deflecting voltage, and it then moves to an end point which is defined by the geometry of the scanning device and an end deflecting voltage, in order thereafter to return to the starting point. If for example a delta voltage is used as the deflecting voltage, then both the movement from the starting point to the end or reversal point and also from the reversal point back to the starting point occurs in each case continuously and substantially linearly in respect of time. It can therefore be assumed that at each moment during a scanning movement, the spacing of the scanning spot or its "centre of gravity" from a reference line which is established by the geometry of the scanning device (for example the line which extends normal to the direction of movement of the scale carrier through the starting point of the path of movement of the scanning spot) is clearly linked to the deflecting voltage which is used at that time, in other words, the deflecting voltage can be used as a measurement in respect of the "deflection" of the scanning spot. Therefore, in order to ascertain the spacing of a marking element from said reference line which then serves as the reference marking element, it is sufficient to detect the value of the deflecting voltage at the moment in time at which the output signal of the receiver passes for example through the above-mentioned "passage through zero", upon scanning of that marking element. In that arrangement, there is no longer any need for special time measurement.

The step of ascertaining the respective value of the deflecting voltage is a particularly simple one if that deflecting voltage is generated by means of a digital-analog converter from a corresponding sequence of digital words because in that case the digital or binary work which is applied to the digital-analog converter at the moment of the "passage through zero" represents a direct measurement in respect of the "deflection" of the scanning spot. It is therefore sufficient for example once to calibrate a scale carrier which is specifically used in such a measuring arrangement, and to store the corresponding values in an electronic storage means or memory, in order then at any time, by means of the deflecting voltage, to be able to detect and measure the instantaneous linear displacement or angular position of the scale carrier.

For calibration of both the scale carrier and also the deflecting voltage values, it is advantageous for the measuring arrangement to carry an incorporated or installed calibration standard, for example in the form of a small auxiliary scale carrier, the spacing of which is known with a high degree of precision. The scanning spot can be controlled in such a way that at least prior to the commencement of the actual measurement operation but preferably also during the measuring procedure, it repeatedly scans the auxiliary scale carrier at intervals.

BRIEF DESCRIPTION OF THE INVENTION

The invention will be described in greater detail hereinafter by means of embodiments with reference to the accompanying drawings in which:

FIG. 1 is a diagrammatic sectional view through a measuring arrangement according to the invention with a scale carrier as the displaceable body, FIG. 2 is a diagrammatic plan view of the scale carrier of the measuring arrangement shown in FIG. 1, FIG. 3 shows the output signal produced by the receiver of the measuring arrangement from FIGS. 1 and 2, when scanning a marking, FIG. 4 is a diagrammatic plan view of a scale carrier in a second embodiment in which the differential characteristic is achieved by means of markings consisting of two regions of different degrees of transparency, FIG. 5 shows the output signal of the receiver when scanning the markings of FIG. 4, FIG. 6 is a diagrammatic plan view of a third embodiment of a marking carrier wherein the differential characteristic is achieved by using two separate photodiodes and two scanning spots, and FIG. 7 shows the output signal of the receiver when scanning the markings of FIG. 6.

DESCRIPTION OF PREFERRED EMBODIMENTS OF THE INVENT

Figure 4:
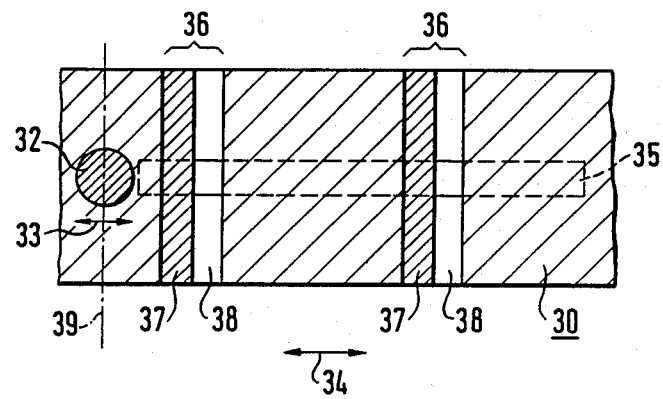
Figure 5:
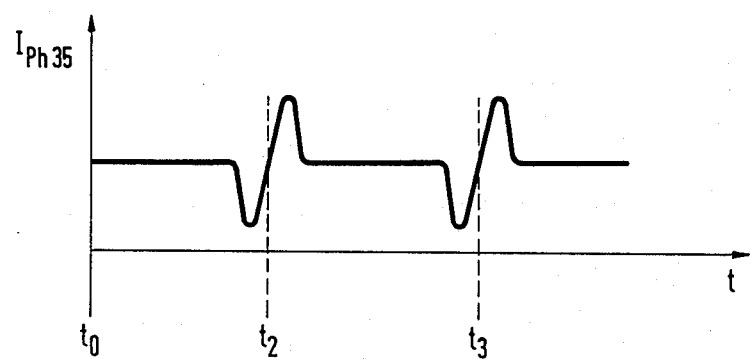

FIG. 1 shows a first embodiment of the measuring arrangement according to the invention, the particular features of which will be described in greater detail more particularly with reference to FIGS. 2 and 3. In addition however FIG. 1 also sets forth the basic structure of a measuring arrangement which is preferred in accordance with the invention, as may also be used in regard to the embodiments described with reference to FIGS. 4 and 5 and FIGS. 6 and 7 respectively.

It will be seen from FIG. 1 that the scanning device of a preferred measuring arrangement according to the invention includes an electron beam tube or CRT 5 whose electron gun 11 serves as a "transmitter" while provided in general terms as the "receiver" is a photodiode, here more particularly being a differential photodiode 8 which is arranged at a fixedly predetermined spacing relative to the fluorescent screen 15 of the electron beam tube 5 in such a way that the photosensitive surfaces thereof face towards the fluorescent screen 15.

The electron gun 11 serves to produce an electron beam 12 which can be focused by means of a Wehnelt cylinder 13 and which can be deflected by electrostatic deflector plates 14. By virtue of FIG. 1 being a sectional view, FIG. 1 only shows two such deflector plates 14 which permit deflection of the electron beam 12 in the plane of the drawing. In the embodiment being considered herein, that one-dimensional deflection capability is totally sufficient. If however the electron beam is also to be deflectible in the plane which is perpendicular to the plane of the drawing in FIG. 1, suitable further deflector plates may be provided, in accordance with the invention.

The measuring arrangement further includes a central unit 10 which comprises a deflecting voltage generator 6, which preferably is a digital/analog converter receiving a series of digital words on line 4 from a storage or memory unit 3. The digital/analog converter converts each of these digital words into a corresponding deflecting voltage value which is fed to the deflector plates 14, in order to deflect the electron beam 12 in a controlled manner. The central unit 10 further comprises a computing unit 9 which, on the one hand, receives on line 13 the digital words which are transmitted from memory unit 3 to digital/analog converter 6 and, on the other hand receives on line 16 the output signal of the differential photodiode 8 in order by means of these received signals, to ascertain the instantaneous position of a displaceable body which in this case is formed by a scale carrier 20 which is disposed between the fluorescent screen 15 and the photodiode 8 and which, in the embodiment illustrated in FIG. 1, is notionally in the form of a linear measuring bar or rule which is displaceable normal to the plane of the drawing.

As FIG. 1 further shows, the light spot 18 produces a scanning spot 22 on the surface of the scale carrier 20 which is towards the fluorescent screen 15 and in respect of which it is assumed that it also carries the markings to be scanned. The scanning spot 22 can be reciprocated over the surface of the scale carrier 20 in the directions indicated by the double-headed arrow 23. So that the measurement values which are produced by the scanning operation are independent of the spacing, which under some circumstances alters slightly, between the fluorescent screen 15 and the surface of the scale carrier 20 which faces theretowards, it is necessary for the main axis of the light beam issuing from the light spot 18 to be normal to the surface of the scale carrier which is to be scanned. In an electron beam tube 5, that is in any case the situation, to a very high degree of approximation. If however that should not be adequate, it is possible to provide for absolutely normal incidence of light on the scale carrier 20 by means of a projection device which is disposed between the fluorescent screen 15 and the scale carrier 20 and which in the simplest case comprises a single lens.

FIG. 2 shows a plan view of the scale carrier 20 and the differential photodiode 8 which is disposed therebeneath, wherein not only is the electron beam tube 5 omitted but also the marking carrier has been turned through 90° so that the double-headed arrow indicating the directions in which the scanning spot 22 can be displaced extends from top to bottom in FIG. 2, while the double-head arrow 24 indicates the direction of movement of the scale carrier 20.

It will be seen that the differential photodiode 8 whose electrical terminals are omitted for the sake of simplicity is arranged in such a way that the limb portion 25 thereof extends at an angle different from 0°, in this case being at an angle of 90°, relative to the direction of movement of the scale carrier 20, as indicated by the arrows 24.

The scale carrier 20 carries a plurality of markings 26 which include an angle which is different from 0° and from 90°, in this case being an angle of about 45°, relative both to the longitudinal direction of the limb portion 25 and also the direction of movement 24 of the scale carrier.

In this embodiment, the scanning spot 22 is moved in the direction of the double-head arrow 23, that is to say precisely parallel to the limb portion 25 of the photodiode 8, over the surface of the scale carrier 20. The differential photodiode 8 is of a length which si somewhat larger than the width of the scale carrier 20. In the position of the scale carrier 20 which is shown in FIG. 2 and in which two markings 26 are disposed in the scanning region, the output signal of the differential photodiode 8 is of the configuration shown in FIG. 3; that is to say, within each scanning cycle there are two times $t_1$ and $t_1'$ at which the brightness of the light impinging on each of the two photosensitive surfaces 27 and 28 of the differential photodiode is of equal magnitude so that the output signal of the differential photodiode has the passages through zero shown in FIG. 3. The spacing in respect of time of the times $t_1$ and $t_1'$ respectively from the starting time $t_0$ of the respective scanning operation provides a measurement in respect of the extent to which the marking 26 being considered has been displaced towards the left or towards the right relative to the reference line 29, that is to say a measurement in respect of the "spacing" of the scanned marking 26 from the reference line 29 which here coincides with the limb portion 25 of the differential photodiode 8. The spacing, width and inclination of the marking 26 are so matched to each other that the upper end of each marking 26 overlaps the lower end of the adjacent marking which is to the left thereof in FIG. 2, to such an extent that a passage-through-zero signal of the above-described kind is obtained in the transitional region in respect of both markings 26, thus ensuring an uninterrupted connection from one marking 26 to the next.

Although in this case the scanning spot 22 is displaced in the direction of the reference line 29, the inclined positioning of the markings 26 means that associated with each deflection of the scanning spot 22 in the direction of the double-headed arrow 23 is a corresponding displacement of the scale carrier 20 in the direction of the double-headed arrow 24.

It will be immediately seen from the description of a scale carrier as set forth with reference to FIGS. 2 and 3 that a body which is displaceable with respect to the measuring arrangement and which carries only a single marking element which is of precisely the same configuration and arrangement as any one of the markings 26 can be adjusted to a predetermined position by means of said marking element and the measuring arrangement according to the invention, in which position for example the output signal of the differential photodiode 8 passes through its passage through zero at a predeterminable value of the deflecting voltage. In that case the reference line 29 corresponding to the predetermined deflecting voltage then serves as the reference marking element. If the adjusting operation involves a step in a photolithographic process in semiconductor manufacture, then for example the silicon wafer may firstly be displaced in the direction indicated by the double-headed arrow 24 until a marking element which is provided thereon and which is of a configuration and arrangement corresponding to a marking 26 passes into the region of movement of the scanning spot 22 and the scanning spot 22 can then pass thereover. The wafer then continues to be moved until the passage through zero of the output signal of the photodiode occurs at an arbitrarily predetermined deflecting voltage. The same procedure is then followed with the photomask which has a marking element of a corresponding configuration and arrangement. Basically therefore, this involves adjusting two different displaceable bodies in succession to one and the same reference line 29. In a corresponding manner, it is also possible to provide for adjustment to two reference lines which are different from each other, for example reference lines which are predetermined by virtue of two different arbitrarily selected deflecting voltages. So that in that case the structures on the silicon wafer and the photomask move into the correct final positions, the two marking elements only have to be arranged in such a way as to be displaced relative to each other in a suitable fashion. Corresponding adjustment can be effected in the direction which is normal to the direction of the double-head arrow 24 in FIG. 2, by means of a second differential photodiode which is arranged in a position of being turned through 90° relative to the differential photodiode 8, in which case the same or other marking elements may be scanned.

The foregoing, relating to the steps involved in relation to the displaceable bodies, required for adjusting operations in respect of bodies which do not carry any marking scales, and in regard to the operating procedure to be carried out, also applies in a corresponding manner in relation to the two alternative constructions for producing an output signal which has a differential characteristic, as will be described hereinafter with reference to FIGS. 4 to 7, on the assumption that the displaceable body is in each case a scale carrier.

For that purpose, FIG. 4 shows those parts of a further embodiment of a measuring arrangement according to the invention, which differ from the embodiment described above with reference to FIG. 2, namely a scale carrier 30 which is shown in plan view and which is displaceable in the direction indicated by the double-headed arrow 34. Disposed beneath the scale carrier 30 is a single elongated photodiode 35 which advantageously covers over two markings, the longitudinal direction of which is disposed at an angle different from 90°, being in this case an angle of 0°, relative to the direction of movement 34 of the scale carrier 30. In this embodiment, the scanning spot 32 is moved in the direction indicated by the double-headed arrow 33, that is to say in the longitudinal direction of the photodiode 35 and thus in the same direction as the direction in which the scale carrier 30 can also be moved. In order for that arrangement to produce a receiver output signal with a differential characteristic, each of the markings 36 comprises two regions 37 and 38 which are in the form of mutually parallel, directly juxtaposed strips, wherein the respective strip 37 is of a substantially lower degree of transparency and the strip 38 is of a substantially higher degree of transparency, than the other regions of the scale carrier 30 which are for example semitransparent. In this embodiment the spacing of the markings 36 is so selected that in any desired position of the scale carrier 30, the scanning spot 32 passes over at least two markings 36, thereby producing the output signal shown in FIG. 5. It will be seen that that output signal firstly moves at a medium level corresponding to the medium transparency of the scale carrier 30, then, when it reaches the region 37 of the first marking 36 being scanned, the signal falls to a minimum, and then, when it passes over the boundary line between the two regions 37 and 38, the signal has a "passage through zero" in order thereafter to pass through a maximum, when the scanning spot passes over the region 38. The same signal sequence occurs when passing over the next marking 36. The spacing in respect of time of the two times $t_2$ and $t_3$ at which a respective passage through zero is started from the starting time $t_0$ of the respective scanning operation can again be used as a measurement for the spacing in respect of space of the two scanned markings 36 from the reference line 39, which is given by the position of the scanning spot 32 at the beginning of each scanning movement.

Figure 6:
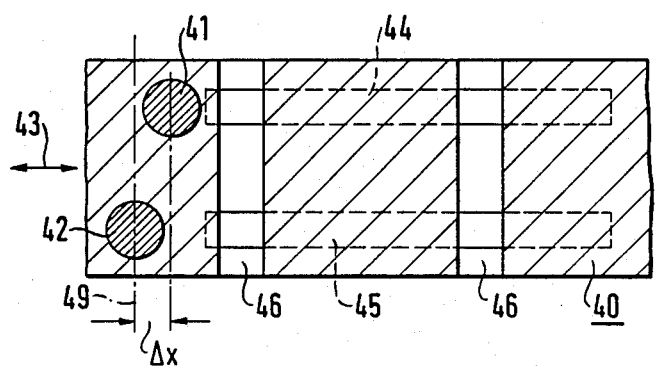
Figure 7:
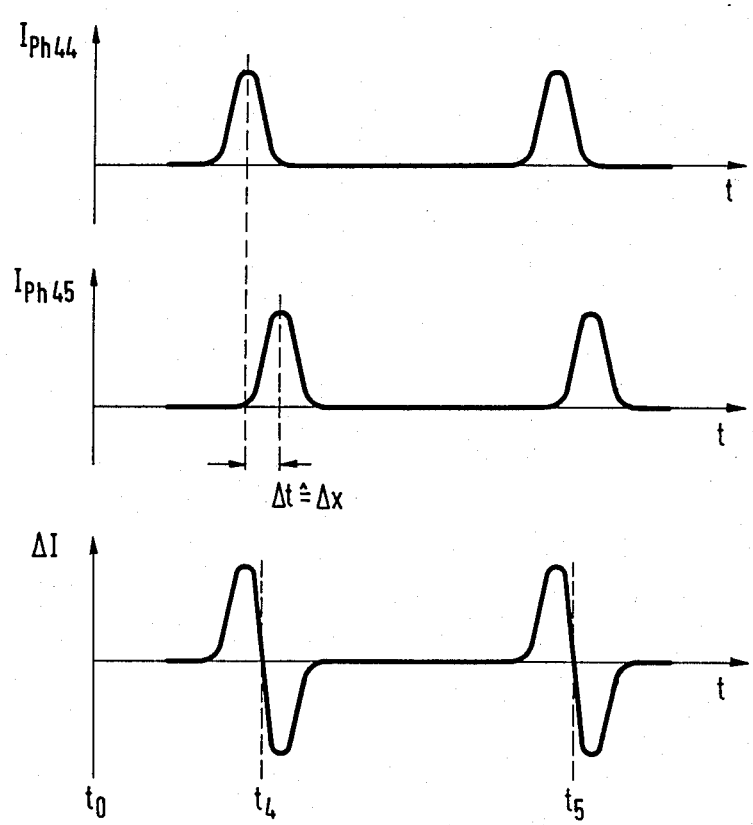

A third embodiment which is shown in FIG. 6 comprises a scale carrier 40, beneath which two elongated photodiodes 44 and 45 are so arranged that their longitudinal directions extend in the direction of the double-headed arrow 47 which indicates the direction of movement of the scale carrier 40. The markings 46 in this embodiment are simple strips or stripes which differ in respect of their transparency from the regions of the scale carrier 40 surrounding same, for example, they are completely transparent strips in an otherwise opaque scale carrier. In this embodiment the scale carrier is scanned by means of two scanning spots 41 and 42 which both move in the direction of the double-headed arrow 43 in such a way that the scanning spot 41 is moved over the photodiode 44 and the scanning spot 42 is moved over the photodiode 45. The two scanning spots 41 and 42 are constantly displaced relative to each other by a distance $\Delta x$, in the direction of the movement thereof, that is to say in the direction indicated by the double-headed arrow 43, so that when one and the same marking 46 is being scanned, the photodiode 44 always supplies an output signal somewhat earlier than the photodiode 45. That is shown in the two uppermost lines in FIG. 7 in regard to scanning of two successive markings 46. If the differential signal of the two photodiode output signals is formed by electronic means, that produces the receiver output signal which is shown in the bottom line in FIG. 7 and which again presents the desired differential characteristic. Here too, the spacing in respect of time of the two times $t_4$ and $t_5$ at which that receiver output signal has its passages through zero, from the start time $t_0$ of each scanning movement, represents a measurement for the spacing in respect of space of the two markings 46 being scanned, from the reference line 49 which is given by one of the two light spot starting points.

It should be expressly pointed out again at this stage that, in the embodiments described and illustrated, there is no need to measure the spacings in respect of time of the times $t_1$ and $t_2$, $t_3$ and $t_4$, $t_5$ respectively, from the respective starting time $t_0$. Although in principle that is possible, instead the deflecting voltage which is applied to the deflector plates 14 at the respective times $t_1$ to $t_5$ may be used directly as a measurement in respect of the deflection of the light spot, which is produced at the time in question, and can thus be used as a measurement in respect of the spacing of the respective marking 26 or 36 or 46 from the respectively associated reference line 29 or 39 or 49.

In the case of the embodiments shown in FIGS. 4 and 6, instead of the elongated photodiodes 35 or 44 or 45, it is also possible in each case to use a "punctiform" photodiode on which the image of the path of the associated scanning spot 32 or 41 or 42 is formed by a suitable optical system. Although the described embodiments were based on the use of linear scale carriers, instead thereof it is also possible to provide for scanning scale carriers which are of a circular or part-circular configuration, in which case the directional references "normal to the direction of movement" and "in the direction of movement" are to be replaced by the directional references "in the radial direction" and "in the tangential direction". Particularly in situations where the entire circular or annular scale carrier is beneath the fluorescent screen of an electron beam tube and therefore all markings can be passed over by a single scanning movement of the scanning spot, which takes place along a circular path, it is advantageous at least in regard to producing calibration values for the spacings in respect of time between the passages through zero of the receiver output signal, which are associated with the individual markings, to be measured with a high degree of accuracy; if those spacings in respect of time are multiplied by the speed of rotation of the scanning means, which can be predetermined with a very high level of accuracy, that gives the angular spacings of the individual markings, with a very high degree of precision.

We claim:

1. A measuring arrangement for determining the distance between a marking element which is provided on a surface of a body displaceable relative to the measuring arrangement in a determined direction of movement, and a reference marking element, wherein said measuring arrangement comprises an electron beam tube being arranged immovably to said reference marking element and comprising an electron gun, a deflector unit and a screen, said electron gun emitting an electron beam by means of which at least one spot of impact is generated on said screen, said at least one spot of impact illuminating said surface of said body by generating at least one scanning spot thereon, and said deflector unit being provided with a deflecting voltage from a deflecting voltage generator, which changes the value of said deflecting voltage in a controlled manner so that said at least one spot of impact and thereby said at least one scanning spot are moved independently of a relative movement between said electron beam tube and said body, thereby said at least one scanning spot passing over said marking element, a receiver receiving radiation influenced by said marking element from said at least one scanning spot and converting it into an electrical output signal, and a storage and computing unit which by means of the output signal of the receiver determines the respective spacing between said marking element and said reference marking element.

2. A measuring arrangement according to claim 1, wherein said reference marking element is a reference line which is predetermined by said measuring arrangement.

3. A measuring arrangement according to claim 1, wherein said receiver includes a differential photodiode having two photosensitive surfaces being separated from each other by a limb portion which extends at an angle which is different from 0° relative to said direction of movement of said body, wherein said marking element is an elongated strip which differs from regions of said surface of said body surrounding it in respect of transparency or reflectivity, its longitudinal direction including an angle which is different from 0° and 90° both to said limb portion of said differential photodiode and also to said direction of movement of said body, and wherein said scanning spot is moved in direction of said limb portion of said differential photodiode over said strip forming the marking element, whereby the output signal of said receiver presents a differential characteristic.

4. A measuring arrangement according to claim 3, wherein said body is a scale carrier on a surface of which is disposed a plurality of scale division markings, one of which respectively forms said instantaneously scanned marking element, and each of which is an elongated strip which differs from regions of said surface of said body surrounding it in respect of transparency or reflectivity, its longitudinal direction including an angle which is different form 0° and 90° both to said limb portion of said differential photodiode and also to said direction of movement of said body, and wherein said elongated strips forming said scale division markings are oriented in mutually substantially parallel relationship and are separated from each other by spacings which are so selected that, in any position of said scale carrier, at least one of said elongated strips crosses both of said two photosensitive surfaces of said differential photodiode.

5. A measuring arrangement according to claim 1, wherein said receiver includes an elongate photodiode having a photosensitive surface the longitudinal direction of which extends at an angle which differs from 90° relative to said direction of movement of said body, wherein the marking element comprises two mutually adjoining regions being formed as elongated strips which are separated from each other by a boundary line, one of said regions having a lower degree of transparency or a lower reflectivity than parts of said surface of said body surrounding it, and the other one of said regions having a higher degree of transparency or a higher reflectivity than parts of said surface of said body surrounding it, wherein said boundary line between said two regions extends at an angle which differs from 0° both with respect to said longitudinal direction of said photodiode and also with respect to said direction of movement of said body, and wherein said scanning spot is moved in said longitudinal direction of said photodiode over said marking element, whereby the output signal of said receiver presents a differential characteristic.

6. A measuring arrangement according to claim 5, wherein said body is a scale carrier on a surface of which is disposed a plurality of scale division markings one of which respectively forms said instantaneously scanned marking element, and each of which comprises two mutually adjoining regions being formed as elongated strips which are separated from each other by a boundary line, one of said regions having a lower degree of transparency or a lower reflectivity than parts of said surface of said body surrounding it and the other one of said regions having a higher degree of transparency or a higher reflectivity than parts of said surface of said body surrounding it, said boundary line between said two regions of each marking element extending at an angle which differs from 0° both with respect to said longitudinal direction of said photodiode and also with respect to said direction of movement of said body, and wherein said elongated strips forming said scale division markings are oriented in mutually substantially parallel relationship and are separated from each other by spacings which are so selected, that in any position of said scale carrier, at least one marking element crosses said photosensitive surface of said photodiode.

7. A measuring arrangement according to claim 1, wherein said receiver includes two elongate photodiodes each having a photosensitive surface, which photodiodes are arranged in mutually parallel relationship and whose longitudinal direction extends at an angle which differs from 90° relative to said direction of movement of said body, wherein said marking element is an elongated strip which differs in regard to transparency or reflectivity from regions of said surface of said body surrounding it, and whose longitudinal direction includes an angle which differs from 0° both with said longitudinal direction of said photodiodes and also with said direction of movement of said body, and wherein two scanning spots are generated and are moved in said longitudinal direction of said photodiodes over said marking element such that two signals are provided, a first one of which is generated by a first one of said two photodiodes upon scanning of said marking element by a first one of said two scanning spots, and a second one of which is generated by a second one of said two photodiodes upon scanning of said marking element by a second one of said two scanning spots, said two signals following each other in a fixed relationship in respect of time in such a way that they are in partially overlapping relationship in respect of time, whereby the output signal of said receiver presents a differential characteristic.

8. A measuring arrangement according to claim 7, wherein said body is a scale carrier on a surface of which is disposed a plurality of scale division markings one of which respectively forms said instantaneously scanned marking element, and each of which is an elongated strip which differs in regard to transparency or reflectivity from regions of said surface of said body surrounding it, the longitudinal direction of each marking element including an angle which differs from 0° both with said longitudinal direction of said photodiodes and also with said direction of movement of said body, and wherein said elongated strips forming said scale division markings are oriented in mutually substantially parallel relationship and are separated from each other by spacings which are so selected that, in any position of said scale carrier, at least one scale division marking crosses the photosensitive surfaces of both photodiodes.

9. A measuring arrangement according to claims 3, 4, 5 or 6, wherein said scanning spot is periodically moved over said instantaneously scanned marking element.

10. A measuring arrangement according to claims 7 or 8, wherein said two scanning spots are periodically moved over said instantaneously scanned marking element.

11. A measuring arrangement according to claim 1, wherein the changing values of said deflecting voltage, which is fed to said deflecting unit from said deflecting voltage generator, are monitored by said storage and computing unit, and wherein a value of said deflecting voltage, which occurs at a moment at which said output signal of said receiver passes through a predetermined voltage level upon scanning of a marking element, is used as a measure for the instantaneous distance between said scanned marking element and said reference marking element.

12. A measuring arrangement according to claim 11, wherein said predetermined voltage level is a zero voltage level.

13. A measuring arrangement according to claims 11 or 12, wherein said deflecting voltage generator is a digital/analog converter to which a series of different digital words is fed in order to generate said different values of said deflecting voltage, and wherein said value of said deflecting voltage, which is used as a measure of the instantaneous distance between said scanned marking element and said reference marking element, is determined from the digital word which is fed to said digital/analog converter at said moment, at which said output signal of said receiver passes through said predetermined voltage level upon scanning of said marking element.

* * * * *